May 23, 1939.         H. J. MURPHY        2,159,446
KNOB FASTENER INSTALLATION AND FASTENER FOR THE SAME
Original Filed July 8, 1937
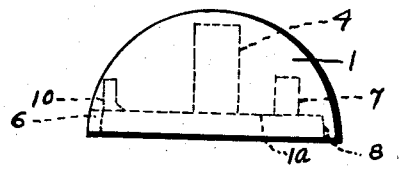
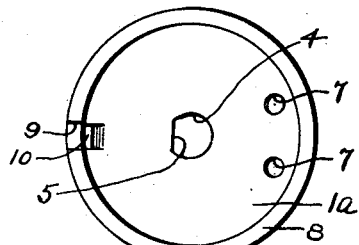
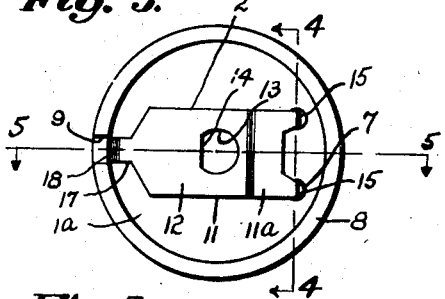
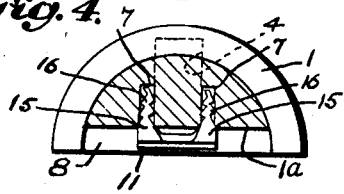
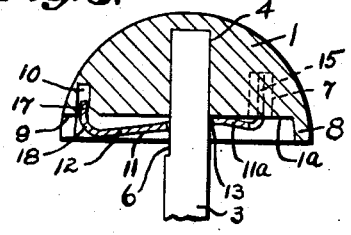
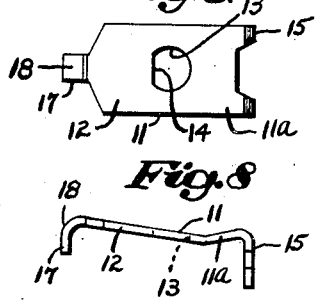
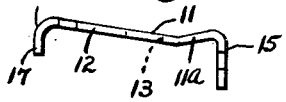
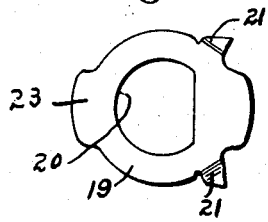
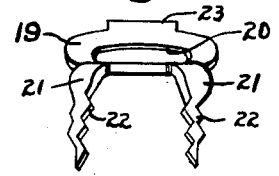
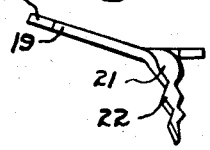
INVENTOR.
Howard J. Murphy.
BY
ATTORNEY.

Patented May 23, 1939

2,159,446

UNITED STATES PATENT OFFICE 2,159,446

KNOB FASTENER INSTALLATION AND FASTENER FOR THE SAME

Howard J. Murphy, Greenwood, Mass., assignor to United-Carr Fastener Corporation, Cambridge, Mass., a corporation of Massachusetts Original application July 8, 1937, Serial No. 152,581, now Patent No. 2,128,730, dated August August 30, 1938. Divided and this application February 18, 1938, Serial No. 191,235

3 Claims. (Cl. 287—53)

The present invention relates to fastener installations for removably attaching an operating member, as for example, a knob or the like, to a shaft, and aims generally to improve the fastener installations as well as the fastener member for the same.

Certain forms of the invention are illustrated in the accompanying drawing, wherein:

Fig. 1 is an edge view of a knob member before attachment of my first form of fastener member thereto;

Fig. 2 is a bottom view of the knob member shown in Fig. 1;

Fig. 3 is a view of the knob member similar to that of Fig. 2 with my first form of fastener member assembled therewith;

Fig. 4 is a section taken along the line 4—4 of Fig. 3;

Fig. 5 is a section taken along the line 5—5 of Fig. 3 with a shaft shown in elevation;

Fig. 6 is a plan view of my first form of fastener member per se;

Fig. 7 is an edge view of the fastener member shown in Fig. 6;

Fig. 8 is an end view of my first form of fastener member per se;

Fig. 9 is a plan view of my second form of fastener member;

Fig. 10 is a side view of the fastener member shown in Fig. 9; and

Fig. 11 is an end view of the fastener member shown in Figs. 9 and 10.

One of the objects of the invention is the provision of a simple and inexpensive fastener member adapted for quick and easy assembly with an operating member which may be any suitable article of manufacture, as for example, a rotatable knob, so as to enable a shaft to be detachably secured to the article.

A principal feature of my invention is embodied in the relative constructions of the articles of manufacture and the fastener members of the respective installations enabling the fastener members to be fixedly secured to the articles of manufacture in proper position for efficient operation in a manner requiring a minimum amount of time and labor.

For purposes of illustration I have chosen to combine my fastener members with knob members such as may be used on radio dial panels or automobile instrument panels, but it is understood that I do not wish to limit the use of my fastener members to articles of manufacture of the type illustrated and described because my fastener members are equally adaptable to use with other articles of manufacture as will be understood from inspection of the drawings and the description hereinafter set forth.

Referring to the installation shown in Figs. 1–5, the article of manufacture with which I have chosen to illustrate my invention is in the form of a knob member 1. In one form of fastener the member 2 is secured in a recess to one end of the knob and provides efficient means for securing a shaft member 3 (Fig. 5) to the knob. The shaft 3 may be of a type commonly used in radio and automobile manufacture for connecting parts of apparatus with finger operative knob means which may be disposed in operating position on a dial or instrument panel.

The knob 1 is preferably formed of a plastic substance such as Bakelite, tenite or the like and has an opening in the form of a bore 4 in the center of an end 1ª thereof which is adapted to receive and support an end of the shaft 3 so as to maintain the shaft 3 in proper position to be gripped by the fastener member, as will be hereinafter described. The bore 4 has a flat side 5 (Fig. 2), in my preferred form, cooperating with a flat side 6 of the shaft 3 whereby the end of the shaft 3 may be fitted more snugly within the bore so as to reduce to a minimum the play between the parts. As it may not be practical to provide an irregular-shaped bore in an article other than one of such material that said bore may be formed inexpensively by a molding process, I do not wish to be limited by the particular cross-sectional shape of the bore illustrated and described because proper operation of the parts of the installation may be carried out if the bore in the body of the article is of a circular shape. A pair of openings 7 (Figs. 2 and 4) are formed in the end 1ª of the knob 1 in spaced relation to the bore 4 with each of the openings 7 spaced one from another. The openings 7 are adapted to receive attaching portions of the fastener member 2 for securing the fastener to the knob. As a means for concealing my fastener member so as to improve the appearance of the knob, I have preferably provided a recess surrounded by a peripheral flange 8 extending from the end 1ª axially of the knob member. The flange 8 has an opening 9 in one side thereof (Figs. 2, 3 and 5), in my preferred form, to permit entrance of a tool through the flange for engagement with a releasing portion of my fastener member, as will be described. An opening 10 (Fig. 5) is preferably formed in the end of the knob near the opening 9 in the flange 8 for receiving a free end of the releasing portion.

One form of fastener member, shown most clearly in Figs. 6, 7 and 8 of the drawing, is formed of one piece of sheet metal material. The fastener member has a spring plate portion 11 of substantially rectangular shape comprising a substantially straight portion 11a and an inclined portion 12 formed as a continuation of the portion 11a. The inclined portion 12 has an aperture 13 for receiving an end of the shaft 3 and is so constructed that in expanded position it may grip the shaft by canting action. For proper operation of my fastening device the area of the aperture 13 should be no greater than is necessary for allowing an end of the rod to pass therethrough, as will be hereinafter more fully described. It will be noticed that the aperture 13 has a flat side 14 (Figs. 3 and 6) which cooperates with the flat side 6 of the shaft 3 for preventing relative rotation of the parts when the same are in fastened relation. As a means for attaching my fastener member to the knob, I have provided attaching portions in the form of prongs 15 integral with an end of the plate 11 and extending in angular relation to the same. Each of the prongs 15, in my preferred form, has teeth 16 on opposed edges presenting shoulders facing in the direction of the base 11 to affix the fastener member more securely to the knob. The distance between the outermost free ends of the teeth on opposed edges of the prongs 15 is preferably slightly greater than the diameter of the openings 7 so that the teeth of the prongs may engage the material of the body of the knob adjacent the respective openings 7 after the prongs have been inserted therein. At the opposite end of the plate 11 from that with which the prongs 15 are integral I have provided an ear-like releasing portion 17. The releasing portion 17 extends out of the normal plane of the base 11 on the same side of the base 11 as the prongs 15 and has a substantially bowed construction providing a camming surface 18 for a purpose to be described. When the inclined portion 12 is in normal expanded position, the free end of the releasing portion extends part way into the opening 10 in the end 1a, as most clearly shown in Fig. 5.

In assembling the parts of my installation together, I first move the fastener member 2 toward the knob so that the free ends of the prongs 15 enter open ends of the openings 7. Then pressure is exerted upon the fastener so as to force the prongs into the openings until the portion 11a of the plate 11 abuts material of the end wall 1a of the knob member (Fig. 5). When the prongs 15 are fully inserted within the opening 7, the teeth 16 engage material of the knob 1 adjacent the respective openings 7 (Fig. 4), preventing ready removal of the prongs therefrom. When the fastener member 2 is in attached position, as shown in Fig. 5, the opening 13 will be slightly out of alignment with the opening of the bore 4.

Attachment of the shaft 3 to the knob through means of the above described form of fastener member is illustrative of the general way by which shafts may be connected to knobs by other forms of fastener members which fall within the scope of my present invention and is carried out in a relatively easy manner through extending an end of the shaft 3 through the aperture 13 of the inclined plate portion 12 into the bore 4. During passage of an end of the shaft 3 through the aperture 13, the pressure of the shaft causes the inclined plate portion 12 to move toward the end 1a whereby the aperture 13 is brought into alignment with the opening of the bore 4 permitting passage of the shaft through the aperture 13 until the outermost end of the shaft abuts material of the knob at the closed end of the bore 4. When pressure on the shaft 3 for moving it through the inclined plate portion 12 is released, the natural resiliency of the plate 11 causes the inclined portion 12 to expand whereby material of the inclined portion adjacent the aperture 13 engages the shaft in a spring grip. To detach the shaft member from the knob it is necessary simply to move a suitable tool through the opening 9 of the flange 8 of the knob member into engagement with the camming surface 18 of the releasing portion 17. As a result, the releasing portion 17 will be started downwardly toward the closed end of the opening 10. Then the plate portion 12 is forced by the tool toward the end 1a of the knob thereby moving the aperture 13 of the inclined portion 12 into substantial alignment with the open end of the bore 4 so that the shaft may be readily separated from the knob. Thus the shaft may be detached from the fastener member even though the free edge of the flange 8 lies adjacent a surface of a panel or the like part.

In Figs. 9 through 11 I have shown another form of fastener member which is similar to the first form but distinguishable therefrom in certain respects. The second form of fastener member has a plate portion 19 providing an aperture 20 therein for receiving a shaft member. At one end of the plate 19 I have provided attaching portions in the form of prongs 21—21 which are adapted to be extended into openings in the material of a knob member. Opposed edges of the prongs 21—21 are provided with teeth 22 adapted to engage material of the member adjacent the prong-receiving openings so as to secure the fastener member to the knob in a manner similar to that by which my first form of fastener member is secured to a knob. The plate 19, in the second form of fastener member, is tipped so as to be in inclined relation relative to a face of the knob member to which it is to be secured, with the result that the fastener member grips a shaft extended through the aperture 20 into the knob member by a canting action. Instead of providing the second form of fastener member with a releasing portion, such as the portion 17 described in connection with the first form of fastener member, I have provided an ear-like element 23 extending from an opposite end of the plate 19 from that with which the prongs 21—21 are integral and lying in substantially the plane of the plate 19, as most clearly shown in Fig. 10. The releasing portion 23 may be pressed either by a finger of the operator or a suitable tool in the direction of the article to which the second form of fastener is attached so as to align the aperture 20 with the shaft-receiving opening of the article for enabling the shaft to be released from the fastener.

In the claims I have referred to the knob member as an operating member and by that term I intend to include a member operated by the shaft as well as a member for operating the shaft.

The present application is a division of my copending application Serial No. 152,581, now Patent No. 2,128,730 of August 30, 1938.

Although I have illustrated and described preferred embodiments of the invention, I do not wish to be limited thereby because the scope of the invention is best defined by the following claims.

I claim:

1. In combination with a shaft and an operating member on one end thereof, of a fastener for securing said member to said shaft, said fastener member comprising a plate-like apertured portion surrounding and normally gripping said shaft as when biased with respect to a transverse plane through said shaft, spaced attaching prongs formed on said plate-like portion and spaced from and extending at an angle to the apertured portion thereof, said attaching prongs adapted to be embedded in the operating member on opposite sides of a plane passing through said shaft, a part of the plate-like portion being angularly disposed with reference to the apertured shaft-gripping portion and bearing against said operating member.

2. A fastener installation comprising in combination, a shaft and an operating member on one end thereof, said operating member being formed with a shaft-receiving bore, a fastener securing said member to said shaft comprising an apertured plate-like portion surrounding and gripping said shaft when biased with respect to a transverse plane through the shaft, a pair of attaching prongs formed integral with said plate-like portion and embedded in said member at points spaced from said shaft-receiving bore, the end of said plate-like portion opposite the attaching prongs having an angular extension extending in a recess in said member and movable with respect to said member to release the apertured shaft-gripping portion from gripping engagement with said shaft.

3. A fastener member for connecting a shaft with an apertured operating member and the like, comprising a spring plate portion having an apertured part surrounding and normally gripping the shaft, an integral attaching prong formed on said plate portion at one end thereof adapted to be embedded in the operating member, and a bearing portion intermediate the apertured portion and the attaching prongs, said bearing portion being substantially perpendicular to the attaching prongs and slightly inclined with respect to the apertured portion and adapted to bear against the operating member to normally bias said apertured portion with respect to a transverse plane through said shaft.

HOWARD J. MURPHY.